United States Patent [19]

Bales et al.

[11] Patent Number: 5,574,724
[45] Date of Patent: Nov. 12, 1996

[54] ADJUSTMENT OF CALL BANDWIDTH DURING A COMMUNICATION CALL

[75] Inventors: Bruce M. Bales, Louisville; Stephen M. Thieler, Boulder, both of Colo.

[73] Assignee: Lucent Technologies Inc., Murray Hill, N.J.

[21] Appl. No.: 451,282

[22] Filed: May 26, 1995

[51] Int. Cl.$^6$ ................................................ H04L 12/54
[52] U.S. Cl. ............................................. 370/68.1; 370/84
[58] Field of Search ................................ 370/58.2, 58.3, 370/60, 60.1, 68.1, 79, 84, 94.1, 95.1; 348/7, 13, 16

[56] References Cited

U.S. PATENT DOCUMENTS

| | | | |
|---|---|---|---|
| 4,796,293 | 1/1989 | Blinken et al. | 379/202 |
| 5,182,751 | 1/1993 | Bales et al. | 370/110.1 |
| 5,195,086 | 3/1993 | Baumgartner et al. | 370/62 |
| 5,313,454 | 5/1994 | Bustini et al. | 370/84 |
| 5,367,523 | 11/1994 | Chang et al. | 370/84 |
| 5,371,534 | 12/1994 | Dagdeviren et al. | 348/14 |
| 5,377,186 | 12/1994 | Wegner et al. | 370/62 |
| 5,420,859 | 5/1995 | Takase et al. | 370/84 |
| 5,463,620 | 10/1995 | Sriram | 370/94.1 |
| 5,463,629 | 10/1995 | Ko | 370/110.1 |
| 5,467,348 | 11/1995 | Fujii et al. | 370/60.1 |

OTHER PUBLICATIONS

International Telecommunication Union (Itu–T, Telecommunication Standardization Sector of ITU), H.320, (Mar. 1993), Recommendation H.320, pp. 1–12.

*Primary Examiner*—Benedict V. Safourek
*Attorney, Agent, or Firm*—John C. Moran

[57] ABSTRACT

Providing capability for increasing, decreasing, or changing types of bandwidth associated with a telecommunication call during the call and through out the call path. New messages can allocate or deallocate bandwidth associated with the call at each intervening switching node through out the call path. All switching nodes of a switching system involved with the resulting call consider the call as a single call. The new messages allow adding video capability to a voice call and, at a still later point in time, removing the video capability from the call. The result is convenience to telecommunication users in that the user is able to utilize any type or amount of bandwidth during a multimedia call. Yet, at any given point in time, the user pays only for the bandwidth that is being utilized.

56 Claims, 8 Drawing Sheets

TRANS 300 (TRANSPORT MESSAGE)

TRANS_ACK 310 (TRANSPORT ACKNOWLEDGE)

TRANS_COM 320 (TRANSPORT COMPLETE MESSAGE)

TRANS_REJ 330 (TRANSPORT REJECT MESSAGE)

ADJUSTMENT OF CALL BANDWIDTH DURING A COMMUNICATION CALL

CROSS-REFERENCE TO RELATED APPLICATIONS

B. M. Bales and S. M. Thieler, Case 30-21, "Variable Communication Bandwidth For Providing Automatic Call Back And Call Hold", Ser. No. 08/451,296, filed May 26, 1995.

B. M. Bales and S. M. Thieler, Case 31-22, "Variable Communication Bandwidth For Conference Call Initiation", Ser. No. 08/452,458, filed May 26, 1995.

B. M. Bales and S. M. Thieler, Case 32-23, "Selective Participation In A Multimedia Communication Conference Call", Ser. No. 97/451,297, filed May 26, 1995; and B. M. Bales and S. M. Thieler, Case 34-24, "Multimedia Conference Call Providing Adjustable Bandwidth For Individual Communication Terminals", Ser. No. 08/452,484 filed May 26, 1995.

These applications are filed concurrently with this application and are assigned to the same assignee.

TECHNICAL FIELD

This invention relates to telecommunication switching, and, in particular, to the ability to add, remove, or subtract transport bandwidth during a communication call.

BACKGROUND OF THE INVENTION

With the emergence of multimedia telecommunication calls, a problem has arisen with the amount of transport bandwidth that well be utilized on a per telecommunication call basis. At present, if a caller anticipates that they may want to have both audio and video with a called party, the caller must set up a call with sufficient bandwidth at the onset of the call. This method is set forth in ITU-T Recommendation H.320 of the International Telecommunication Union (ITU). Another possibility is for the caller to set up an audio call only; and when it becomes necessary to have video communication, the caller then sets up a second call which is a video call to the called party. This other possibility is described in U.S. Pat. No. 5,371,534. The method of initially setting up the call with sufficient bandwidth is expensive if it later proves that a video portion of the call is not required. The establishing of a second call, which is a video call, would appear to be an acceptable approach. However, this method suffers from the problem that there are now two distinct telecommunication calls set up through various switching systems that are unaware that these calls are related. The problem arises when a telecommunication feature is later invoked. The intervening telecommunication systems are unaware that the feature must be invoked on two separate calls. For example, assume that the caller calls the called party via an audio call, and then later, sets up a second call that is a video call to the called party. During the subsequent conversation, the caller and the called party wish to add a third party in a telecommunication conference call. The problem is that each of the two calls that is set up must be conferenced together individually in order for the result to be a video and audio telecommunication conference. Other features such as call forwarding, present even greater complications.

SUMMARY OF THE INVENTION

A technical advance is achieved by an apparatus and method that provide for increasing, decreasing, or changing types of bandwidth associated with a telecommunication call. The apparatus responds to new messages that can allocate or deallocate bandwidth associated with the call at each intervening switching node through which the call goes. Advantageously, all switching nodes of a switching system involved with the resulting call consider the call as a single call. The new messages allow adding video capability to a voice call and, at a still later point in time, removing the video capability from the call. The result is convenience to telecommunication users in that the user is able to utilize any type or amount of bandwidth during a multimedia call. Yet, at any given point in time, the user pays only for the bandwidth that is being utilized.

Advantageously, a terminating terminal or switch node transmits a first message through an established call path. The first message contains first information defining a requested change in bandwidth. Each switch node is responsive to the first message to ascertain if the switch node has the capability for providing the change requested by the first information. If the switch node does not have the full requested capability, the switch node modifies the first information to equal the ascertained capability before transmitting the first message to the next sequential switch node. If the switch node does have the requested capability, it transmits the first message with the received first information to the next sequential switch node. Be:fore the transmission of the first message, each switch node provides the capability defined by the transmitted first information. When the first message is received by the destination point, which can be terminal or switch node, the destination point ascertains its capability to provided the requested change. Then, the destination point inserts its ascertained capability into second information of a second message that is transmitted back to the terminating terminal or switch node. Each switch node in the call path is response to the second message to change the bandwidth for the call path as defined by the second information. Upon receipt of the second message, the terminating terminal or switch node can accept the change in bandwidth of the call path or terminate the call.

Advantageously, data, voice, and video concentrators, etc. can be terminating terminals on the switching system. Such devices can use the new messages to request different types of bandwidth. This capability allows such devices to adjust their communication costs as their communication requirements change due to increased or decreased communication traffic.

DETAILED DESCRIPTION

Figure 1:
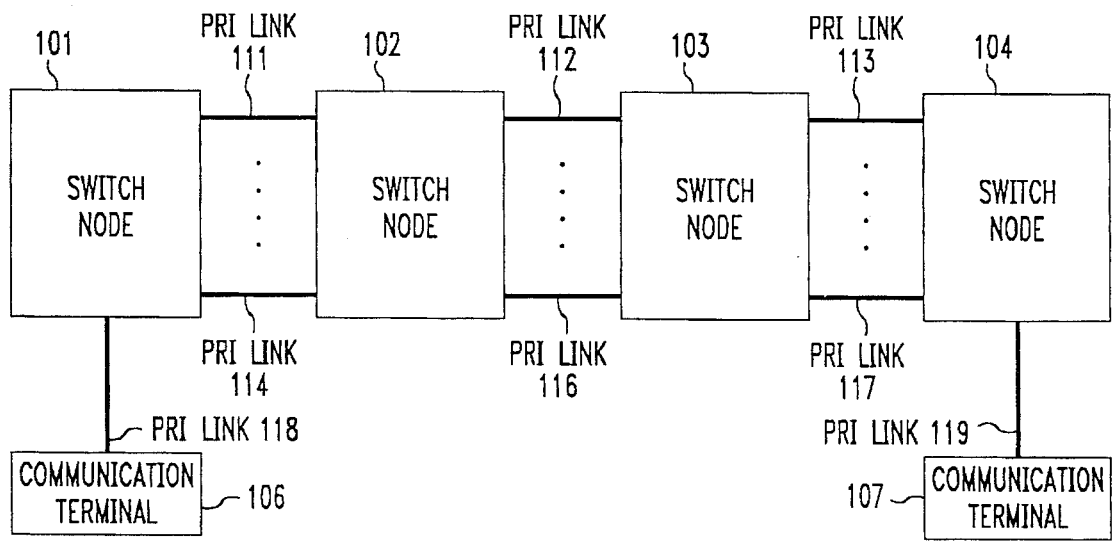
FIG. 1 illustrates, in block diagram form, a telecommunication switching system embodying the inventive concept.

FIG. 1 illustrates a plurality of switch nodes 101–104 that are interconnected by a plurality of primary rate interface (PRI) links 111–117. For descriptive purposes only two communication terminals, communication terminals 106 and 107, are illustrated in FIG. 1. Communication terminals 106 and 107 are connected to switch nodes 101 and 104 via PRI links 118 and 119, respectively. However, basic rate interface (BRI) links could also be used. Consider the following two examples to help in the understanding of the operation of the switch nodes illustrated in FIG. 1. Assume that communication terminal 106 originates a logical call to communication terminal 107. As is well known in the ISDN signalling protocol, a set up message is first transmitted from switch node 101 to switch node 104 via switch nodes 102 and 103. Each switch node is responsive to the set up message to establish the necessary call information. Upon receipt of the set up message, switch node 104 alerts communication terminal 107 via link 119 and sends back to switch node 101 an alerting message. When communication terminal 107 answers the call, switch node 104 transmits to switch node 103 a connect message. Upon receipt of the connect message, switch node 103 establishes a logical path and transmits a connect message to switch node 102 which also establishes a logical path. When the connect message is received by switch node 101, it connects communication terminal 106 to the logical path that has been established through switch nodes 101–104.

Figure 2:
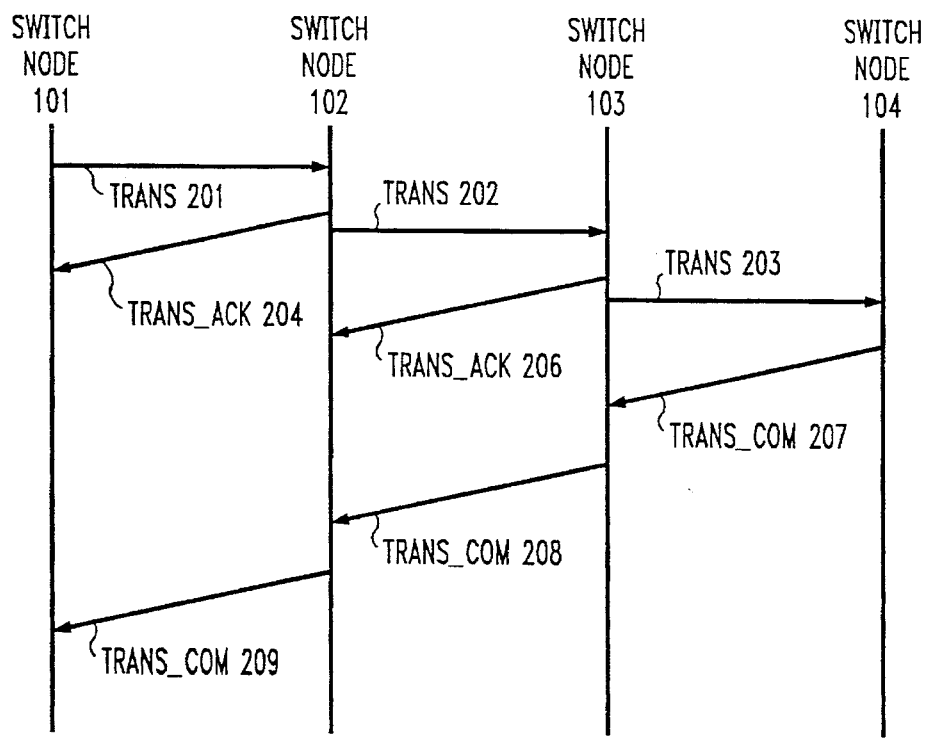
FIG. 2 illustrates the message flow embodied in the inventive concept.
Figure 3A:
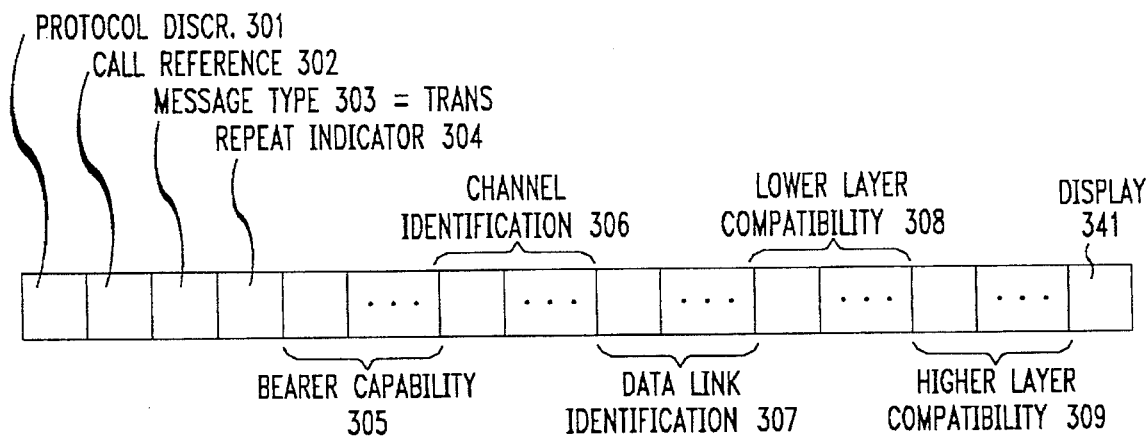
FIG. 3 illustrates the messages utilized to implement the inventive concept.
Figure 3B:
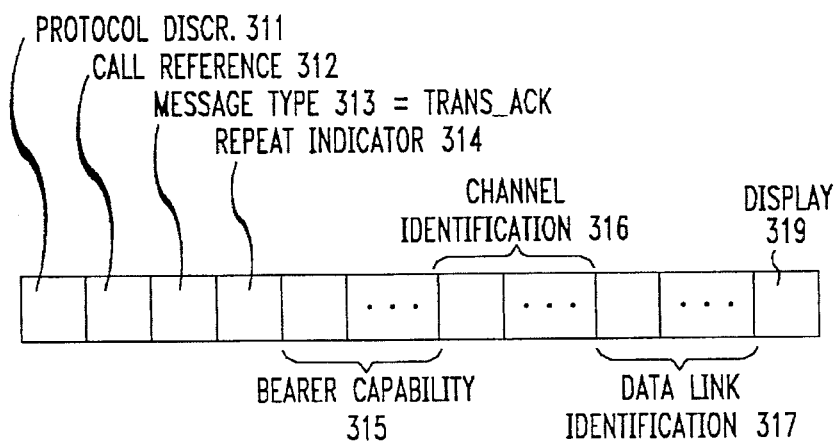
Figure 3C:
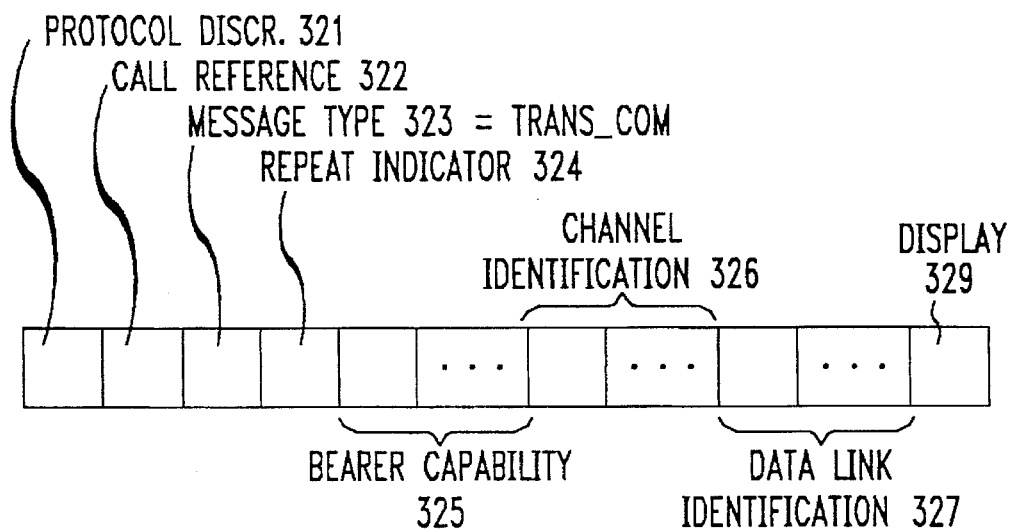
Figure 3D:
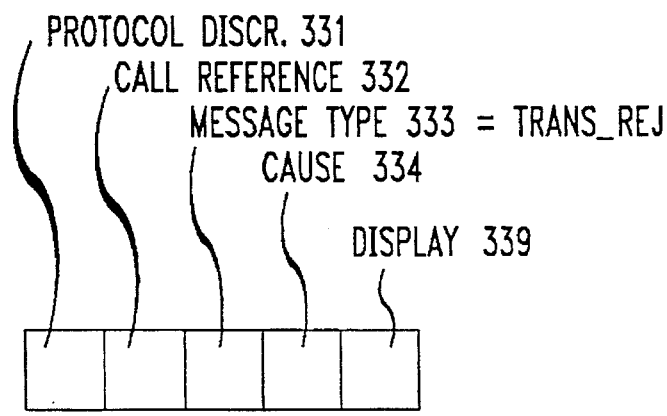

At a subsequent time, the users of communication terminals 106 and 107 desire a video capability so that they can exchange video images. Communication terminal 106 requests that switch node 101 add video capability to the call. Switch node 101 does this by transmitting TRANS 201 (transport) message as illustrated in FIG. 2 to switch node 102. TRANS 201 message requests that a video capability be added to the call. (The actual contents of the message will be discussed in greater detail later.) If switch node 102 can provide the video capability, it transmits back TRANS ACK 204 message as illustrated in FIG. 2. In addition, switch node 102 transmits TRANS 202 message of FIG. 2 to switch node 103. This message also requests that a video capability be set up between switch node 102 and switch node 103. Assuming switch node 103 is capable of providing the video capability, it transmits back to switch node 102 TRANSACK 206 message and transmits TRANS 203 to switch node 104. If switch node 104 can provide the video bandwidth and communication terminal 107 has video capability, switch node 104 transmits to switch node 103 TRANS COM 207 message. This message is repeated back to switch node 101 via switch nodes 103 and 102. If at a still later point in time, the user of communication terminal 106 desires that the video capability be eliminated, communication terminal 106 sends a message to switch node 101 requesting the elimination of the video capability. The messages illustrated in FIG. 2 are once more sent through the switch nodes. However, the TRANS messages now request that the video bandwidth be removed.

In video and audio calls, the video and the audio capability can be provided in the following two ways: first, a channel can be used for the video and a second channel can be used for the audio. Second, the audio information can be included with the video information in the video channel. The transport message can cause switch nodes to drop the audio channel and add the video channel with the companion audio information.

When processing the transport message, the switch nodes have the capability of negotiating with each other using the transport acknowledge (TRANSACK message). To illustrate this capability consider the following example. Communication terminal 106 wishes to add an audio, video and high speed data capabilities to a logical call with communication terminal 107. Switch node 101 transmits to switch node 102 a transport message requesting that these three types of bandwidth be added to the call. Switch node 102 has the resources to provide that capability and acknowledges this by the transmission of an acknowledge message to switch node 101. Switch node 102 then transmits a transport message to switch node 103. Switch node 103 only has resources sufficient to support audio bandwidth and video bandwidth and transmits this fact to switch node 102 in a transport acknowledge message. Switch node 102 accepts these conditions. Switch node 103 then transmits a transport message to switch node 104 requesting that audio and video capabilities be added to the call. Switch node 104 only has resources to provide only audio bandwidth. Since switch node 104 is the endpoint, it transmits back to switch node 103 a transport complete message. The transport complete message specifies that only audio bandwidth is provided for in this call. Upon receiving the transport complete message, each switch node changes the bandwidth capability for the call to audio only.

FIG. 3 illustrates the details of the four new messages utilized to implement the inventive concepts illustratively with respect to CCITT ISDN Q.931 standard of messages and procedures. One skilled in the art can readily see that the inventive concepts could be applied to other standards. The transport message is TRANS 300. The transport message consists of information elements (IE) 301–309 and 341. Protocol discriminator 301 IE defines the protocol that is being used. It defines that the protocol is ISDN Q.931 in the present embodiment. Call reference IE 302 gives the call reference number that defines the call for which the transport message is modifying the bandwidth. Message type IE 303 is set equal to TRANS since this is the transport message. Repeat indicator IE 304 defines whether the transport message is being used to add, remove, or change bandwidth on the call designated by call reference IE 302.

Bearer capability IEs 305, channel identification IEs 306, data link identification IEs 307, lower layer compatibility IEs 308, and higher layer compatibility IEs 309 define the totality of the transport capabilities being defined by the transport message. Lower layer compatibility IEs 308 and higher layer compatibility IEs 309 are used only by the endpoints. Whereas, bearer capability IEs 305, channel identification IEs 306, and data link identification IEs 307 are utilized by the switching nodes within the network providing transportation for the call. Note, that the endpoints also utilize IEs 305, 306, and 307. Bearer capability IEs 305 define the requested capabilities in high level definitions such as voice, data, and video. The channel identification IEs 306 define the logical interface and physical channel within that physical interface. Between two switching nodes, the switching nodes negotiate a logical interface number for each interface between them. A network layer is responsive to the logical interface number to convert it to a system interface number (sintf) which lower layers convert to a physical interface number. For clarity, the high level description refers to the channel identification IEs as specifying the physical interface. For example, if video is being requested, then one of the channel identification IEs 306 for that request defines the physical interface and the channel such as channel 1 which is a 384 Kbs channel within the specified PRI link. If a voice capability was being requested, one of the channel identification IEs defines a particular B channel such as channel 23. An IE in the bearer capability IEs 305 requesting video has the same position in the bearer capability IEs 305 as the corresponding IE designating the physical interface and channel in the channel identification IEs 306. If packet data links are being requested, these are specified as to physical channels in channel identification IEs 306 with additional information being specified in the data link identification IEs 307. The IEs for data link identification are arranged in order as needed to support channel identification IEs 306. The information in bearer capability IEs 305 specifies when an IE from data identifications IEs 307 is needed. For example, if bearer IEs 305 specified: video, voice, and data, channel identification specifies the physical and only one data link identification IEs 307 is used. This IE would specify what logical link on the physical channel was to be used.

Figure 4:
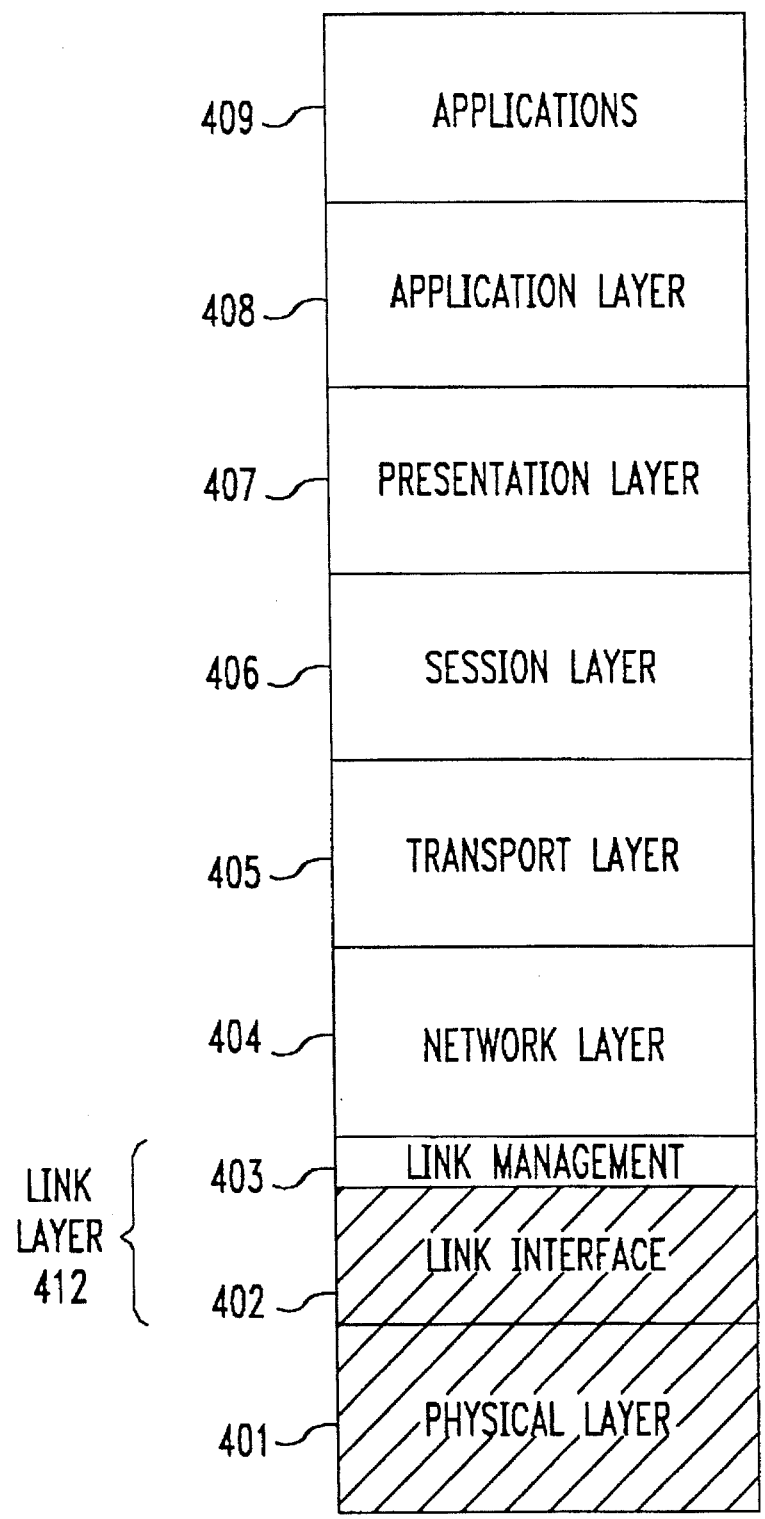
FIG. 4 illustrates a software architecture for use with the inventive concept.

Lower layer capability IEs 308 and higher layer capabilities 309 are usually utilized only by the endpoints, and these IEs are directed to defining for the destination endpoint what type of a call is being set up and the protocol being used. The low layer compatibility IEs 308 are utilized by physical layer, link management layer, and network layer as illustrated in FIG. 4; whereas, higher layer compatibility IEs 309 are utilized by software layers above network layer 404 of FIG. 4. To understand the relationship between the layer capabilities IEs and the bearer capability IEs, consider the following example. If a user wishes to set up a data packet connection utilizing LAPF protocol, from switch node 101 to switch node 104 the user can do this using two methods. The first method is to specify in the bearer capability that a LAPF packet connection is to be set up. In this case, it is not necessary to include any information in the lower layer capability IEs 308 and may not be necessary to include any information in the higher layer capabilities 309. The switch nodes are responsive to the bearer capabilities to set up the packet switching connection in the most convenient manner. In general, the switch node will set up this packet connection as a packet connection rather than as a circuit connection. In the second example, the user wishes to have a 64 Kb circuit connection set up through switching nodes 102 and 103 and only implement the LAPF protocol at the endpoints, switch nodes 101 and 104. In this case, switch node 101 would request in the bearer capability 305 of the transport message a 64 Kbs per second circuit switch connection. The transport message then would include in the lower layer capability of IEs 308 the fact that this is to be a packized data connection utilizing the LAPF protocol. In this manner, the packetized connection is guaranteed to have a predictable transmission time through switching nodes 102 and 103. In addition, the purpose may be to run a proprietary packet protocol on the circuit switch 64 Kbs data connection through switch nodes 102 and 103. Higher layer capability IEs 309 define to presentation layer 407 of FIG. 4 the high layer protocols that are to be used with information being received by the network layer. Presentation layer 407 conditions messages for use by the applications in applications layer 409 of FIG. 4. Examples of the types of protocols that presentation layer 407 may operate with are: X400 email standard, g4 fax standard, file transfer, or screen sharing standard. As can be easily seen, these higher level protocols are of no concern to the intervening switching nodes 102 and 103.

The transport acknowledge message, TRANSACK 310 is illustrated in FIG. 3. IEs 311, 312, 314 have identical functions to those described for IEs 301, 302, and 304. Message type IE 313 is set equal to TRANSACK. Upon receiving a transport message, a switch node within the network responds with a transport acknowledge message. If the receiving switching node can provide all of the transport capabilities requested in IEs 305, 306, and 307, the transport acknowledge message only consists of IEs 311–314. If the receiving switching node cannot provide a particular transport capability, that transport capability is defined in IEs 315 and 316 or IEs 317 and 316. For example, if the transport message has requested video transport which the receiving switching node cannot provide, then the video capability is specified in IEs 315 and 316 of the transport acknowledge message. Display IE 319 may define the reasons why this capability is not provided. If the sending switching node does not wish to accept the reduction of transport capabilities, the sending switching node's only option is to abandon the transport message request. Once again, call reference IE 312 defines which call the transport acknowledge message is associated with.

The transport complete message, TRANSCOM 320 is also illustrated in FIG. 3. The transport complete message is utilized to define to each switching node that is communicating the call the resulting transportation capabilities that have been added, removed, or changed with respect to the call. If all switching networks in the call path have accepted the requested transport capability, the transport complete message consists only of IEs 321–324. If one or more of the requested transport capabilities cannot be provided, those capabilities are defined in IEs 325, 326, and 327. Each switching node in the call path retains a record of any transport capability that it may have eliminated from the receive transport message and includes this eliminated transport capability in the transport complete message. The result is that when the originating endpoint receives the transport complete message that message defines to the originating endpoint what the transport capability of the call is. Also, as intervening switching network nodes receive the transport complete message they eliminate transport capability that they had agreed to provide for the call if that transport capability is not present in the transport complete message.

Transport reject message, TRANSREJ 330 is utilized to reject a transport message. IEs 331–333 and 339 are identical in function to IEs 301–303 and 341 of the transport message. IE 334 defines the reason why the transport message is being rejected.

The previous examples have discussed the operation of the system illustrated in FIG. 1 in terms of interactive communication terminals that are utilizing a mix of voice, video, and data. Communication terminals 106 and 107 could also be the terminating points of a call path. In which case, the communication terminals 106 and 107 would directly receive and transmit the transport messages and carry out all operations previously described for switch nodes 101 and 104. Further, different types of communication terminals could utilize the call path, for example, to multiplex a plurality of voice calls or a plurality of video calls from communication terminals 106 to 107. In this situation, the communication terminals utilize the messages illustrated in FIG. 3 to add or subtract bandwidth to meet the particular loads on the communication terminal at any point in time. The preceding description has been described in terms of adding call capability. However, the messages illustrated in FIG. 3 could be utilized by a variety of terminals. For example, such terminals could include be not be limited to packet multiplexers, voice call multiplexers, and video transport channels multiplexers. The messages of FIG. 3 give the communication terminals the ability to adjust the amount of bandwidth being used at any instant in time therefor reducing the cost to the communication terminals for information flowing through switch nodes 101–104. Switch nodes 101–104 are described in greater detail in U.S. Pat. No. 5,386,466 which is hereby incorporated by reference.

FIG. 4 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 404 of switching node 101 negotiates with its peer layer (the corresponding network layer 404 in switching node 102) in order to obtain allocation of a B channel in PRI link 150—a procedure later to be repeated if a second B channel is desired. This negotiation is carried out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been set up to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as TMA applications. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner.

Further information on the operation and software structure of layers 401 through 409 is given in U.S. Pat. No. 5,386,466, entitled "Automatic Initialization of a Distributed Telecommunications System". U.S. Pat. No. 5,386,466 is hereby incorporated by reference.

Figure 5:
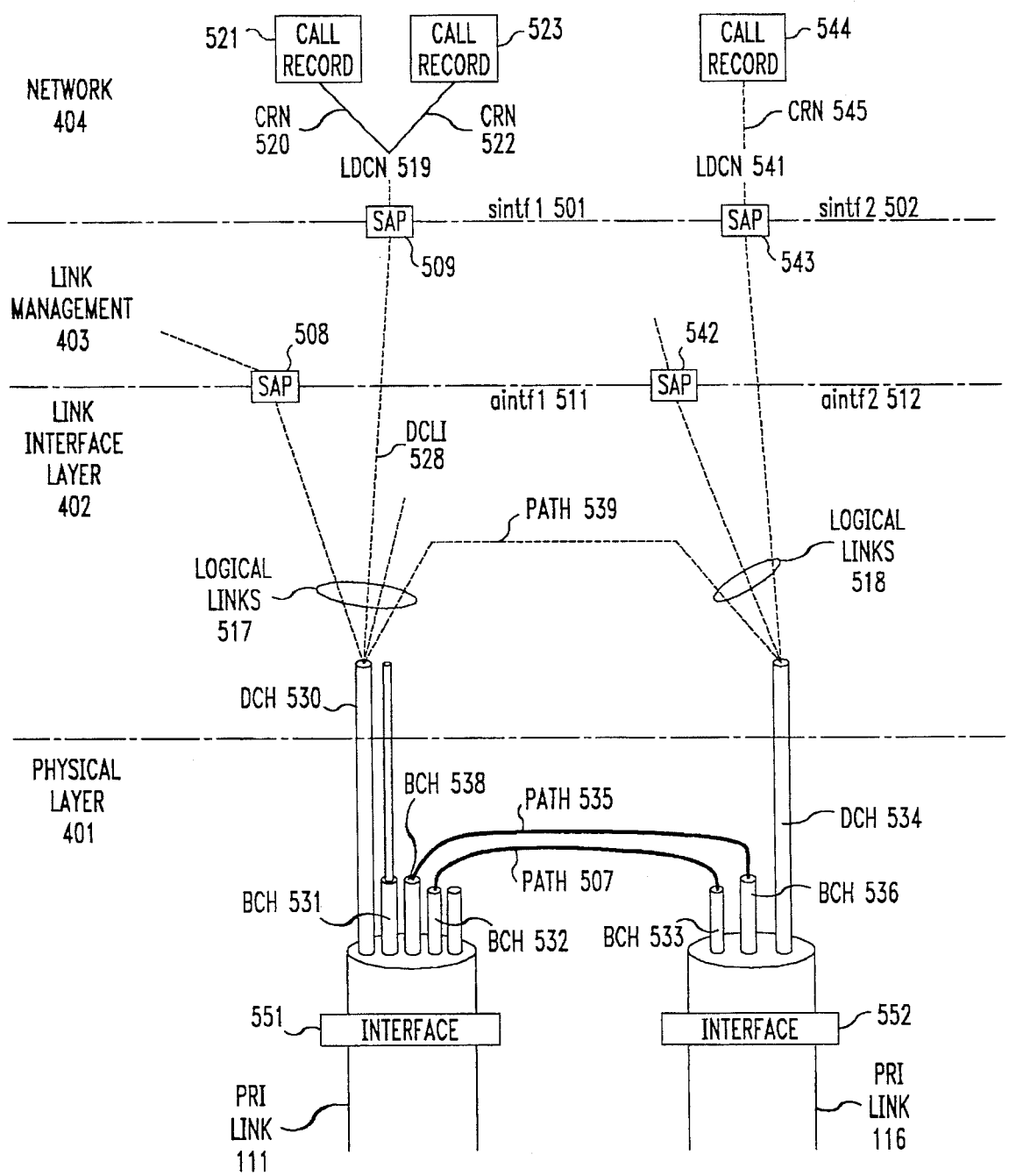
FIG. 5 logically illustrates the signaling and transport paths that are set up within a switch node.

FIG. 5 logically illustrates the general relationships between data link connection identifiers (DLCI), service access point identifiers (SAPI), terminal end identifiers (TEl), system interface numbers (sintf), switches angel interface numbers (aintf), logical D channel numbers (LDCN), call reference numbers (CRN), and the various software layers. As illustrated in FIG. 5, the pair of link interface layers and physical layers are implemented on an angel. (The concept of angels is explained in U.S. Pat. No. 5,386,466.) Link interface layer 402 and physical layer 401 are implemented by a local angel. A node processor in switch node 102 implements link management 403, network 404, and higher layers. The node processor provides overall control of switch node 102. Sintf, switch and aintf numbers correlate to physical interfaces. The sintf numbers are utilized by network software layer 404 and higher software layers to identify physical interfaces. In addition, two switching nodes, interconnected by a link that is terminated on both ends by a physical interface, negotiate a logical interface number for the link during initialization of the link.

When a transport message is received, network layer 404 converts the logical interface numbers in the channel identification IEs to sintf's. Network layer 404 views the physical interfaces as being identified by sintf1 501 and 502. Link management 403 makes a conversion between the sintf numbers and the switch and aintf numbers which together represent the physical interface. For example, link management 403 converts sintf1 501 to the local angel and aintf 511. Link interface layer 402 utilizes aintf 1511 to identify physical interface 551. There is a one for one correspondence between sintf1 501 and sintf2 502 and aintf1 511 and aintf2 512.

The sintf and aintf numbers identify specific interfaces, and each interface has a number of channels. For example, PRI interfaces 551 and 552 each have 24 channels. Network layer 404 identifies the channels associated with a particular sintf by using the actual physical channel numbers, and similarly, link interface layer 402 utilizes the physical channel numbers in association with an aintf number. This is possible because the specifications of the ISDN standard designate that physical channel 24 is used to perform signaling. Network layer 404 and higher layers utilize sintf numbers in order to control the link interface layers and physical layers to interconnect physical channels and to create specific protocols on these channels. The manner in which B channels are interconnected through physical networks such as network 515 is not illustrated in FIG. 5 except in a logical manner, e.g. path 507.

Further, FIG. 5 logically illustrates the utilization of the various channels and the points at which these channels are terminated and at which information is utilized. B channel 532 of interface 551 is interconnected to B channel 533 of interface 552 by path 507. Path 507 is made through a network internal to a switch node. It would be obvious to one skilled in the art that similar paths could be made between B channels in interface 551 and 552. The circuit switching of B channels is performed at the physical layer; whereas, packet switching or frame relaying is performed at the link interface layer. Greater detail on operations of the layers of FIGS. 5 and 6 in setting up a call are set forth in U.S. Pat. No. 5,386,466.

This section describes the transport messages from the prospective of applications software layer 409, session software layer 406, transport software layer 405, and network software layer 404 through switch node 102. To clarify the explanation, first a brief description is given of how a call is initially set up through switch node 102.

Figure 6:
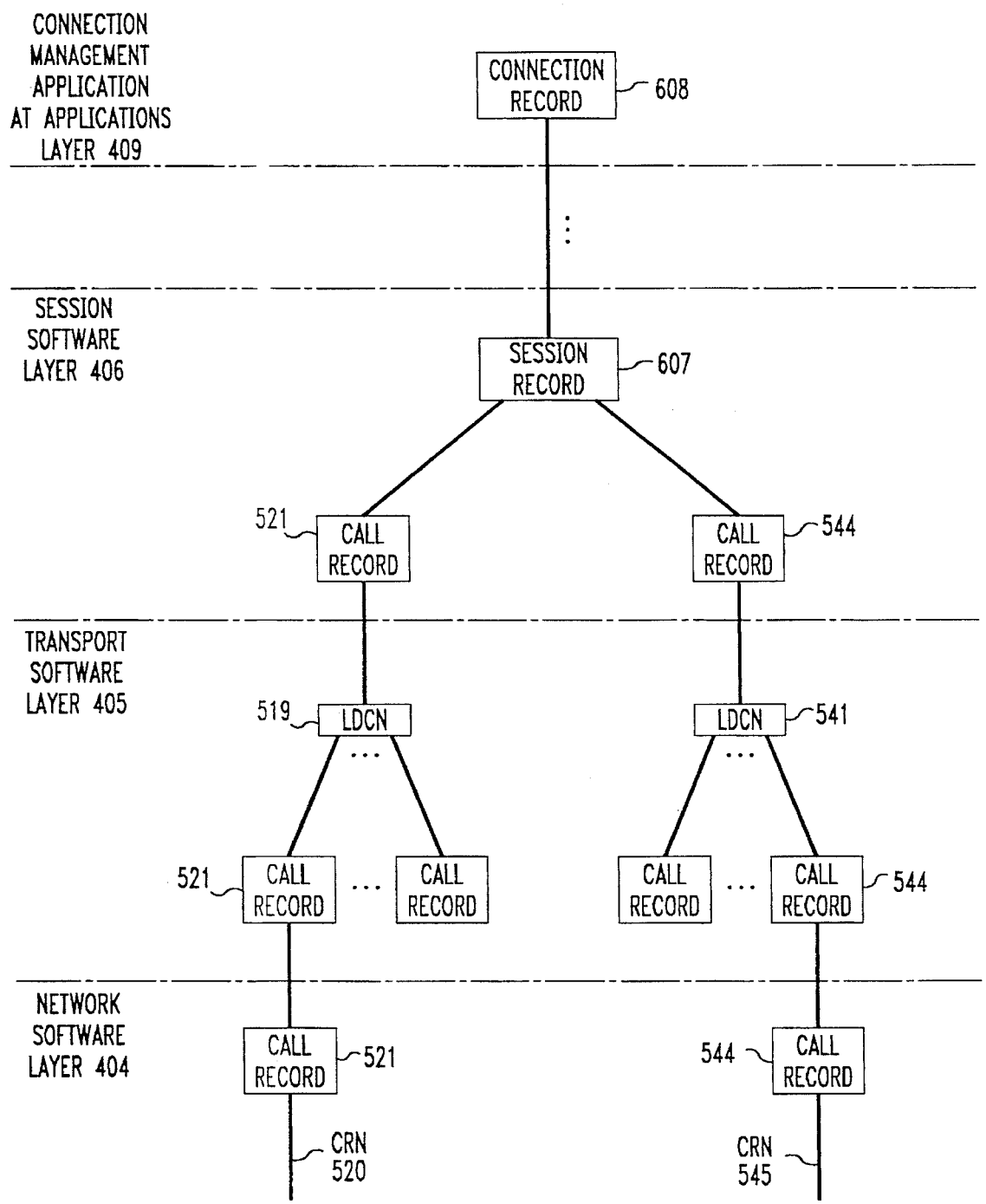
FIG. 6 illustrates the logical structure of a call through the network, transport, session, and application software layers.

FIG. 6 illustrates the manner in which calls are identified and processed between network software layer 404, transport software layer 405, session software layer 406, and applications software layer 409. Switching node 102 is executing these software layers. At network software layer 404, each half of a call is identified by the CRN number, e.g. CRN 520, and a call record, e.g., call record 521, as previously described with respect to FIG. 5. As can be seen from FIG. 6, the call record is common throughout the software layers, and each layer uses additional information along with the call record. The call records are taken from a common table within each switching node, and a call record number is unique within a particular switching node.

Transport software layer 405 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 6 for a particular call. Session software layer 406 is the point within the software architecture where halfs of calls are joined together for purposes of exchanging signal information by each call having a unique session record set up for it such as session 607. The session record is associated with two call records such as call record 521 and call record 544 with each call record representing half of a call. (Each half of a call is referred to as a "half call".) An exception to this rule is if the call is to an application. In that case, only one call record is utilized since the other half of the call terminates at the application software layer.

To understand how calls are processed by the three software layers illustrated in FIG. 6, first consider the example of setting up a call through switch node 102. For this example, reference must be made to FIG. 5 which illustrates the interfaces associated with call records 521 and 544. Call record 521 is associated with PRI link 111, and call record 544 is associated with PRI link 116 in the following example.

Assume that a call is being placed from switching node 101 to switching node 104 via switching node 102. LDCN 541 is associated with PRI 116 which interconnects switching node 102 to switching node 103 as illustrated in FIG. 1. Further, assume that the node number in the setup messages designates switching node 104. (The manner in which routing decisions are made in switch node 102 for a call from switch node 101 to switch node 104 is set forth in U.S. Pat. No. 5,386,466.) When the setup message is received from switching node 101 via PRI link 111, network software layer 404 generates a setup indication which is communicated to transport software layer 405 and establishes call record 521 which starts the setting up of the first half call. Transport software layer 405 examines the node number and determines that switching node 102 is not the destination switching node; hence, layer 406 does not set a node flag. If the node flag was set, this indicates that the call terminates on switch node 102. The dialed number along with the node flag is communicated to session software layer 406 which, because the node flag is not set, does not attempt to route a call based on the dialed number. Since in the present example the node flag is not set, session software layer 406 establishes session record 607 and call record 544 is selected which starts the setting up of the second half call. The node and the call record number are then communicated to transport software layer 405 as a setup request. Transport software layer 405 interrogates the level 4 routing table and determines that LDCN 541 is a path to switching node 104. Transport software layer 405 then associates call record 544 with LDCN 541 and transmits the setup request to network software layer 404 which then establishes communication with switching node 103 via PRI link 116.

After switch node 102 has sent a setup message to switch node 103 via PRI link 116, the network software layer of switch node 103 responds with a call proceeding. Network software layer 404 is responsive to the call proceeding message to notify a connection management application that it should establish the connection through switch node 102 switching network to interconnect B channel 532 and B channel 533 so as to establish path 507. Session record 607 points to connection record 608. Connection record 608 is maintained by the connection management application which is executing at applications layer 409. The connection management application is responsive to the message from network software layer 404 to establish this connection and to enter into connection record 607 the parameters of the internal connection.

To further understand how the transport messages are utilized to increase or decrease bandwidth through switch node 102, consider the following example. Assume that the setup message that was described in the previous paragraph setup a voice connection through switch node 102 which resulted in path 507 of FIG. 5 being set up through the switching network of switch node 102. Next, switch node 101 requests that a packet switch connection be established on D channel 530 and that a 64 Kb data channel be established on channel 538 by using a transport message.

In order to establish the additional bandwidth necessary for the data link executing the LAPF protocol and a data channel having 64 Kbs, switch node 101 transmits to switch node 102 a transport message that has the following information. Call reference IE 302 is set equal to CRN 520 of FIGS. 5 and 6, message type IE 303 is set equal to TRANS. Repeat indicator IE 304 is set to add bandwidth. Bearer capability IEs 305 are as follows. The first bearer capability IE specifies a packet data link using the LAPD protocol, and the second IE is set equal to a circuit data link with 64 Kbs of bandwidth. Channel identification IEs 306 are as follows. The first IE specifies interface 551 utilizing the logical interface number, and specifies the use of D channel 530. The second IE of the channel identification IEs 306 specifies interface 551 and B channel 538. A single data link identification IE 307 follows and specifies that one of the logical links 517 is to be used for packet data. Lower layer capability IE 308 specifies the proprietary protocol that switch node 104 is to implement with respect to the 64 Kb data channel. Higher layer compatibility IE 309 specifies that the X400 email protocol standard is being implemented. This transport message is received and disassembled by network software layer 404 of FIG. 6. If network software layer 404 is capable of providing the requested transport capabilities, network transport layer 404 responds with a transport acknowledge message that contains only IEs 311, 312, 313, and 319. If network 404 cannot provide one of the requested transport capabilities, it identifies the particular transport capability that could not be provided in IEs 315, 316, and 317, and indicates in the repeat indicator 314 that this particular transport capability must be deleted. In addition, the transport acknowledge message could also indicate using another bearer capability, channel identification, and data link identification IEs, as an alternative to what had been requested.

In the present example, network software layer 404 can provide the requested transport capabilities. Network software layer 404 then transmits to session software layer 406 via LDCN 519 of transport software layer 405 the request to add transport capabilities. Session software layer 406 utilizes session record 607 to call record 544 to determine that the call utilizes LDCN 541 and uses LDCN 541 to notify network software layer 404 that additional work is to be done with respect to call record 544.

Returning for a moment to the left half of the call that is illustrated by call record 521 and LDCN 519 of FIG. 6. Network software layer 404 transmits to the connection management application the new parameters that have been added to the connection identified by call record 521. The connection management application is responsive to this information to store the additional connection information in connection record 608.

In the right half of the call that is identified by call record 544 and LDCN 541, network software layer 404 is responsive to the bearer capability IEs of the message that has been received from switch node 101 to determine which transport facilities should be utilized to meet the requirements of these bearer capability IEs. As illustrated in FIG. 5, network software layer 404 utilizes one of the logical links of logical links 518 to provide the data link utilizing the LAPD protocol and B channel 536 to provide the capabilities of the 64 Kb data channel. Note, if network software layer 404 had available a B channel which had been subdivided into logical links, network software layer 404 could have used one of these logical links for the data link executing the LAPF protocol. Network software layer 404 now forms a new transport message that includes the bearer capability IEs that are identical to those received from switch node 101 and channel identification IEs 306 and data link identification IEs 307 that are specific to the transport capabilities being utilized with interface 552. The lower layer compatibility IEs 308 and higher layer compatibility IEs 309 are simply transported up the left half of the call to session software layer 406 which then transmits them down the right half of the call where they are assembled into the new transport message by network software layer 404. Network software layer 404 then transmits the transport message to its peer network software layer in switch node 103.

In our present example, the network software layer in switch node 103 accepts all of the transport capabilities requested in the transport message. The network software layer in switch node 103 responds with a transport acknowledge message which contains no IEs 315, 316, or 317. Network software layer 404 in switch node 102 is responsive to this transport acknowledge message to transmit to the connection management application in application layers 409 of FIG. 6 the parameters for the left half of the call so that these can be stored in the connection record 608. The connection management application is also responsive to this information to control the switching network of switch node 102 to setup path 535. In addition, connection management application transmits a message to link interface layer 402 to setup path 539.

At this point, paths 507, 535, and 539 are set up through switch node 102. In the present example, when switch node 103 attempts to establish the original transport capabilities, switch node 104 is unable to provide the data link utilizing the LAPD protocol. The result is that switch node 103 in the left half of the call which is similar to that illustrated in FIG. 6 has recorded in its connection record the voice bandwidth, the data link using LAPD protocol, and the 64 Kb data channel. However, in the connection record for the right half of the call, only the voice call and the 64 Kb data link are recorded. Upon receiving the transport complete message from switch node 104, via network software layer, the connection management application in switch node 103 only connects the 64 Kb data link. Note, that the voice call connection was made during the setup process. Switch node 104 then transmits a transport complete message that identifies the bearer capability, channel identification IEs, and data link identification IEs that are in use. This message is received by switch node 103 and is transferred up the right half of the call through the software layers to session software layer 406 of switch node 103 which communicates it down the left half of the call to network software layer 404 of switch node 103. Network software layer 404 eliminates the data link capabilities and informs the connection management application that the data link is no longer being utilized. In response, connection management application of switch node 103 eliminates the data link information from connection record of switch node 103. Network software layer 404 in switch node 103 then assembles a transport complete message that details the fact that only the 64 Kb data link has been set up and transmits this transport complete message to switch node 102.

When network software layer 404 of switch node 102 receives the transport complete message from switch node 103, it informs the connection management application that path 539 is to be eliminated. The connection management application then eliminates from connection record 608 reference to the data link executing the LAPD protocol. Network layer 404 then transmits the transport complete message through session software layer 406 down into the left half of the call. Network software layer 404 is responsive to this transport complete message to notify the connection management application to eliminate the reference to the data link executing the LAPD protocol from connection record 608. The connection management application also transmits a message to link interface layer 402 to remove path 539. In the left half of the call, network software layer 404 then assembles another transport complete message for transmission to switch node 101.

At a later point in time, switch node 101 determines that the 64 Kb data link is no longer required, switch node 101 transmits a transport message where repeat indicator 304 is set equal to remove and the bearer capability IEs 305, channel identification IEs 306, and data link identification IEs 307 specify that the 64 Kb data link is to be removed. Switch node 102 then repeats this message and sends it to switch node 103. Upon receiving the transfer acknowledge message back from switch node 103, network software layer 404 requests that the connection management application remove path 535. In addition, connection management application updates the connection record 608 as requested by network software layer 404. When the transport message requesting the removal of the data link is received by switch node 104, it responds with a transport complete message that specifies that this removal should have taken place.

Returning now to when switch node 104 received the transport message that set up the 64 Kb data channel, switch node 104 responds in a similar manner with respect to IEs 305 through 307 as the other switch nodes did. The termination point of a call is a terminal management application that is executed in applications level 409 of FIG. 4. Greater details on the functions of a terminal management application are given in U.S. Pat. No. 5,182,751 and U.S. Pat. No. 5,386,466. Briefly, a terminal management application provides all of the control functions required to terminate a call and to allow the terminal to utilize the communicated data. A terminal management application can be executed on a switch node whereby the majority of the terminal control functions are done in the switch node rather than within the communication terminal. On the other hand, a communication terminal, such as communication terminal 107, can include its own computer and be executing the software structure illustrated in FIG. 4. In this case, the terminal management application is executing on the terminal. With respect to FIG. 1, communication terminal 107 would then be the termination point of the call rather than switch node 104. However, with a different type of communication terminal being utilized for communication terminal 107, the terminal management application could be executing in switch node 104.

In the previously examples, it had been assumed that the terminal management application was executing in switch node 104. That assumption will continue to be used. When the transport message was received to set up the 64 Kb data channel, this message was transported to the terminal management application at applications level 409. The terminal management application then requested that the connection manager request that link interface layer 402 implement the proprietary protocol that is defined in the low layer compatibility IEs 308 so that the link interface layer can properly use the low level proprietary protocol. In addition, the connection manager application instructs the presentation layer 407 of switch node 104 to implement the X400 email standard as defined in by the higher layer compatibility IE 309.

Figure 7:
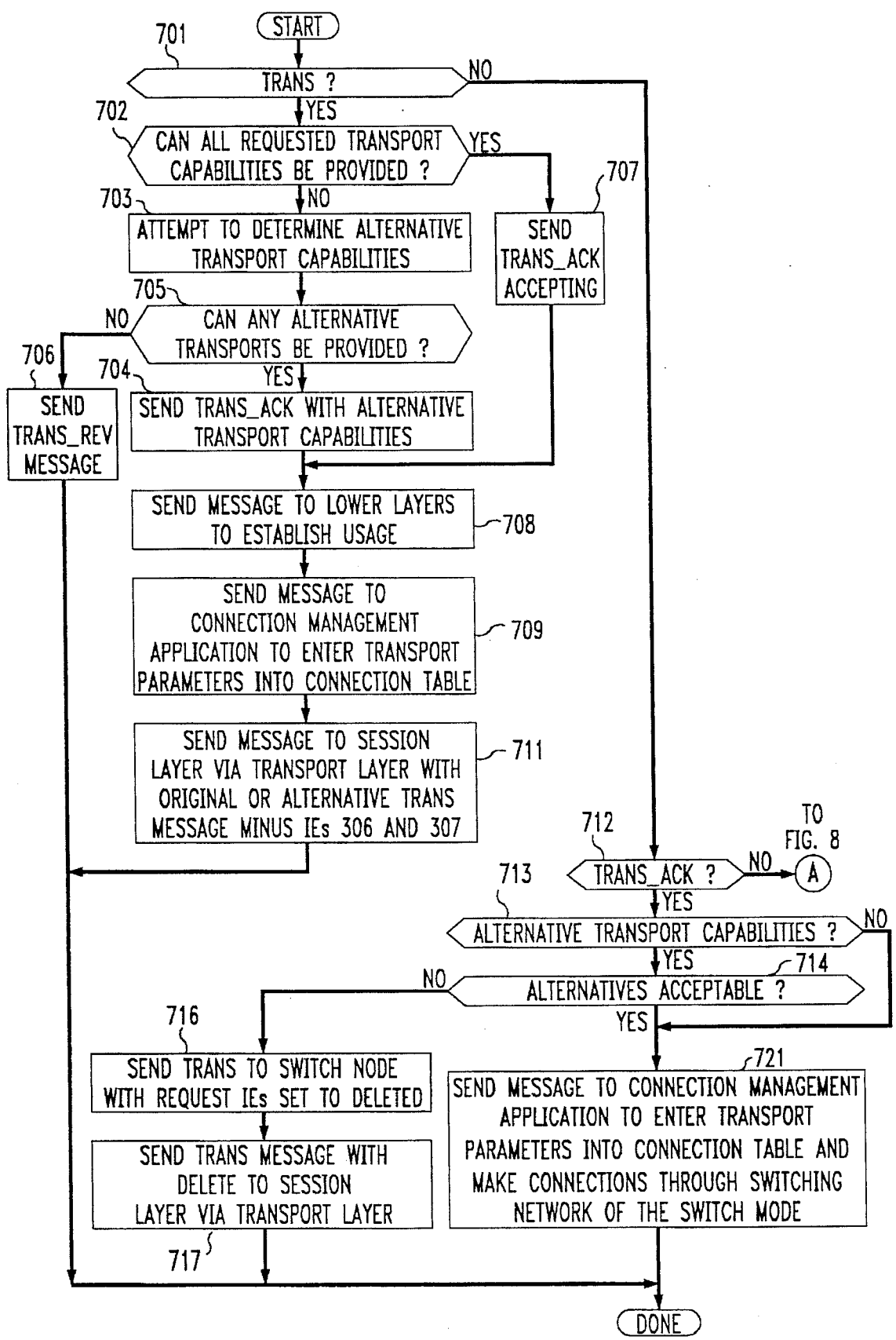
FIGS. 7, 8, and 9 illustrate, in flow chart form, the response of a network layer to the transport messages.
Figure 8:
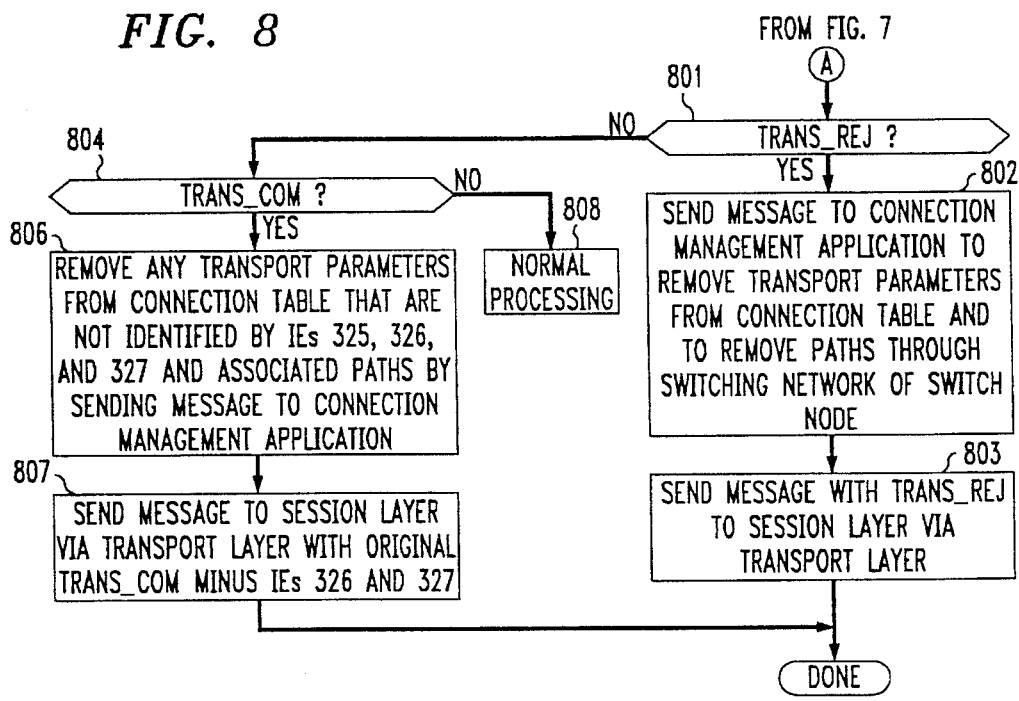
Figure 9:
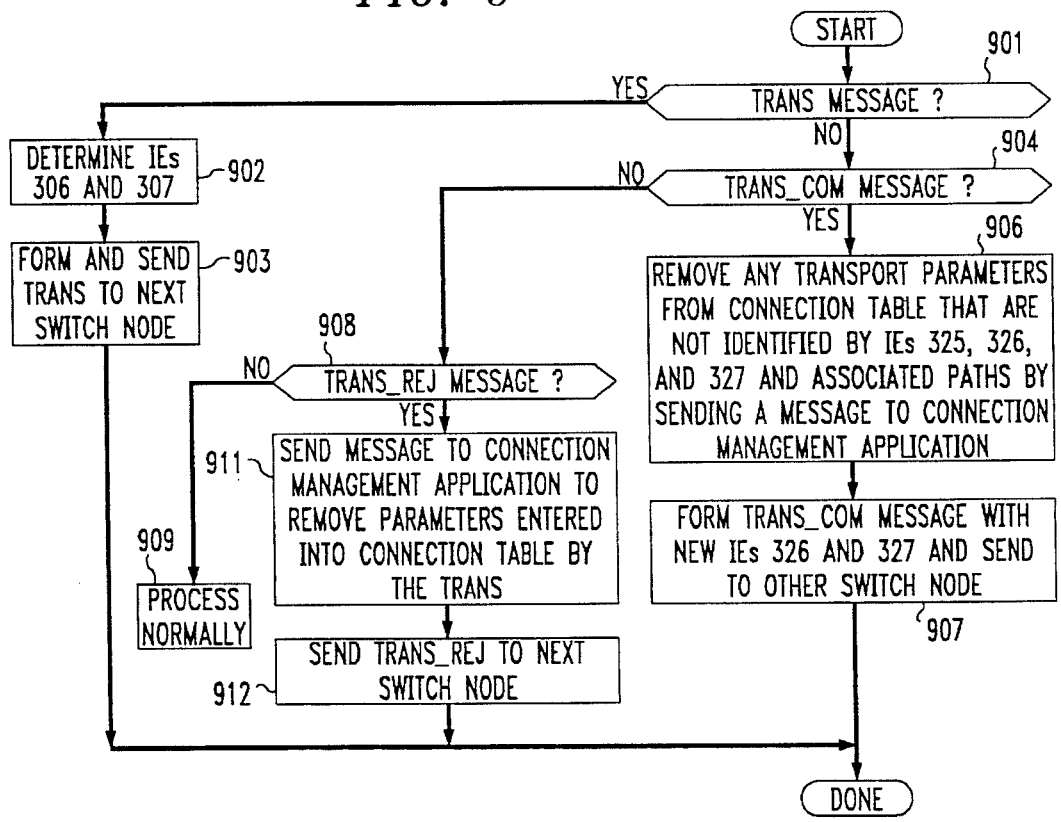

FIGS. 7, 8, and 9 illustrate, in flowchart form, the operations performed by network software layer 404 in implementing the transport messages illustrated in FIG. 3. Network software layer 404 performs the majority of the work in implementing the transport messages. FIGS. 7 and 8 illustrate the responses of network layer 404 upon receiving a transport message from another switching node. FIG. 9 illustrates the responses of network software layer 404 upon receiving a transport message from the session layer 406. The convention used in these figures is that that transport messages being received or sent to another switch node are identified only by their message code, e.g., TRANS. On the other hand, transport messages being relayed by session software layer 406 from the other half of the call are designated by the message code and the word "message", e.g., TRANS message.

Decision block 701 of FIG. 7 determines whether a TRANS message has been received from another switch node. In the previous example, switch node 102 receives a TRANS message via interface 551 from switch node 101. If the answer in decision block 701 is yes, decision block 702 determines whether the requested transport capabilities that are defined by bearer capability IEs 305, channel identification IEs 306, and data link identification IEs 307 can be provided. If the transport capabilities can be provided, block 707 is executed which sends back a TRANSACK message that contains no IEs 315, 316, and 317. If the answer in decision block 702 is no, block 703 attempts to determine an alternative transport capability. If none of the transport capabilities can be provided, a TRANSREJ message is sent and all further processing is terminated. If at least one original or alternative transport capability can be provided, a TRANSACJ message is returned with the modified list of transport capabilities. Next, block 709 sends a message to the connection management application at applications layer 409 requesting that the transport parameters as defined by the new transport capabilities be entered into connection table 608. The transport parameters entered are either those of the originally requested transport capabilities or the alternative transport capabilities or the resulting combination of the two. Finally, block 711 sends a TRANS message to session layer 406 via transport layer 405 which is the original TRANS message and/or alternative transport capabilities minus IEs 306 and 307. IEs 306 and 307 are unique to the left half of the call as illustrated in FIG. 6. Session software layer 406 is responsive to this message to identify the call record, to identify LDCN associated with the right half of the call, and to send the message down the right half of the call with the proper identification to network software layer 404.

Returning to decision block 701, if the answer is no, control is transferred to decision block 712 which determines if a TRANSACK message was received from another switch node. In the previous example, a TRANSACK message was received by switch node 102 from switch node 103 on interface 552. This TRANSACK message was received by the right half of the call. If the answer in decision block 712 is yes, control is transferred to decision block 713. The latter decision block determines if there are alternative transport capabilities in the transport acknowledge message. If the answer is yes, control is transferred to decision block 714 which determines if the alternative transport capabilities are acceptable, i.e., the switch node can provide the alternative transport capabilities. If the answer in decision block 714 is no, block 716 is executed which sends a TRANS message to the other switch node with a request to delete any transport capabilities that are not acceptable. Next, block 717 sends a TRANS message with the same delete request included to session software layer 406 via transport layer 405. Session layer 406 is responsive to that message to transport the message down the left half of the call to network software layer 404. Note, that the transport parameters are only inserted into the connection record and paths established within a switch node upon reception of an acceptable TRANSACK message.

Returning to decision blocks 713 and 714. If the answer in decision block 713 is no, or the answer in decision block 714 is yes, control is transferred to block 721 which sends a message to the connection management application to enter the transport parameters into the connection table and to make the connections through the internal switching network of the switch node.

Returning to decision block 712, if the message is not a TRANSACK message, control is transferred to decision block 801 of FIG. 8 which determines if the message is a TRANSREJ message. If the answer in decision block 801 is yes, block 802 sends a message to the connection management application to remove the transport parameters from the connection table and to remove any paths having been set up for those transport parameters through the switching network of the switch node. Note, that there may not be any work for the connection management application to do if the TRANSREJ message is received in place of a TRANS ACK. After execution of block 802, block 803 sets a message containing the TRANSREJ message to session layer 406 via transport layer 405. Session software layer 406 sends this message down the left half of the call with the proper call record and LDCN identification information to network software layer 404.

If the answer in decision block 801 is no, control is transferred to decision block 804 which determines if the message is a TRANSCOM message. If the answer is no, control is transferred to block 808 which provides normal processing. Block 808 handles the standard ISDN messages. If the answer is yes in decision block 804, block 806 determines which transport parameters that are in connection table 608 are not identified by the bearer capability IEs 325, channel identification IEs 326, and data link identification IEs 327. After identifying these transport parameters, block 806 transmits a message to the connection management application to remove these transport parameters and any associated paths. Finally, block 807 sends a message to session software layer 406 via transport software layer 405 that contains the original TRANSCOM minus the channel identification IE 326 and the data link identification IE 327. Session software layer 406 is responsive to that message communicated down the left half of the call to network software layer 404 with the call record and LDCN identification information.

FIG. 9 illustrates the operations performed by network software layer 404 in response to transport messages being received from session software layer 406. Decision block 901 determines if the message is a TRANS message. In the previous example, the right half of the call illustrated in FIG. 6 receives a TRANS message from session software layer 406 after the left half of the call had received that message from switch node 101 via interface 551. If the answer is yes in decision block 901, control is transferred to block 902. Block 902 is responsive to the bearer capability IEs 305 to determine what the new channel identification IE 306 and data link identification IEs 307 should be for the TRANS message that will be transmitted to the next switch node. After this determination is made, block 903 forms and sends the new TRANS message to the next switch node. Note, that elements 301, 302, 303, 304, 305, and 308, 309, and 341 are simply repeated in the new TRANS message.

If the answer in decision block 901 was no, decision block 904 determines if the message received from session software layer 406 is a TRANSCOM message. If the answer in decision block 904 is yes, decision block 906 determines the transport parameters that are in connection table 608 that are not identified in bearer capability IEs 325, channel identification IEs 3216, and data link identification IE 327. After determining these transport parameters, block 906 transmits a message to the connection management application requesting that these transport parameters be removed from the connection table 608 and that all associated paths be removed. Next, block 907 forms a TRANSCOM message with new channel identification IEs 326 and data link identification IEs 327 that define the transport capabilities on the left half of the call. Block 907 then sends the formed TRANSCOM message to the other switch node.

If the answer in decision block 904 is no, control is transferred to decision block 908 which determines if a TRANSREJ message was received from session software layer 406. If the answer is no, control is transferred to block 909 for normal processing of standard ISDN messages. If the answer in decision block 908 is yes, block 911 sends a message to the connection management application to remove all parameters entered into connection table 608 by the associated TRANS message. Finally, block 912 sends a TRANSREJ message to the next switch node. In the previous example, block 912 sends the TRANSREJ message from switch node 102 to switch node 101.

It is to be understood that the above-described embodiments are merely illustrative of the principles of the invention and that other arrangements may be devised by those skilled in the art without departing from the spirit or scope of the invention.

The invention claimed is:

1. A method of switching communication bandwidth on a communication path through a switching system, and the switching system having a plurality of switch nodes, the method comprising the steps of:

transmitting by a terminating one of the plurality of switch nodes a first message for switching the communication bandwidth on the communication path through the switching system;

receiving the first message via a signaling channel that is part of the communication path by a first one of the plurality of switch nodes;

determining a requested change in telecommunication bandwidth by tile first one of the plurality of switch nodes from the first message;

modifying the communication bandwidth through the switch node to provide the requested communication bandwidth; and transmitting by a first one of the plurality of switch nodes the first message via the signaling channel to a next sequential one of tile plurality of switch nodes in the communication path.

2. The method of claim 1 wherein the communication bandwidth is modified by type of bandwidth.

3. The method of claim 1 wherein the communication bandwidth is increased.

4. The method of claim 1 wherein the communication bandwidth is decreased.

5. The method of claim 1 wherein the step of modifying comprises the step of ascertaining a capability of the one of the plurality switch nodes to provide the requested communication bandwidth.

6. The method of claim 5 wherein the step of modifying further comprises the step of only providing the ascertained capability of communication bandwidth for the communication path by the one of the plurality of switch nodes.

7. The method of claim 6 wherein the step of transmitting comprises the step of setting the requested change of the first message equal to the ascertained capability before transmission via the signaling channel by the one of the plurality of switch nodes.

8. The method of claim 7 wherein the next sequential one of the plurality switch nodes is a destination switch node of the communication path, the method further comprises the steps of ascertaining a capability of the next sequential one of the plurality of switch nodes to provide the requested communication bandwidth;

only providing the ascertained communication bandwidth by the destination switch node;

forming a second message in response to receipt of the first message by the destination switch node;

inserting allocation information into the second message that is equal to the ascertained capability to provided requested communication bandwidth by the destination switch node; and transmitting the formed second message back on the signaling channel by the destination switch node.

9. The method of claim 8 further comprises the step of readjusting the communication bandwidth by each of the plurality of switch nodes in the communication path to be equal to that specified by the allocation information in response to receipt of the second message by each of the plurality of switch nodes.

10. A method of switching communication bandwidth on a communication path through a switching system, from a origination terminal to a destination terminal and the switching system having a plurality of switch nodes, the method comprising the steps of:

transmitting by all origination terminal a first message for switching the communication bandwidth on the communication path through the switching system;

changing the communication bandwidth as specified by the first message by the plurality of switch nodes and the destination terminal without reestablishing the communication path;

the step of changing comprises the steps of receiving the first message via a signaling channel that is part of the communication path by a first one of the plurality of switch nodes;

determining a requested change in telecommunication bandwidth by the first one of the plurality of switch nodes from the first message;

modifying the communication bandwidth through the switch node to provide the requested communication bandwidth; and transmitting by a first one of the plurality of switch nodes the first message via the signaling channel to a next sequential one of the plurality of switch nodes in the communication path.

11. The method of claim 10 wherein the communication bandwidth is modified by type of bandwidth.

12. The method of claim 10 wherein the communication bandwidth is increased.

13. The method of claim 10 wherein the communication bandwidth is decreased.

14. The method of claim 10 wherein the step of modifying comprises the step of ascertaining a capability of the one of the plurality switch nodes to provide the requested communication bandwidth.

15. The method of claim 14 wherein the step of modifying further comprises the step of only providing the ascertained capability of communication bandwidth for the communication path by the one of the plurality of switch nodes.

16. The method of claim 15 wherein the step of transmitting comprises the step of setting the requested change of the first message equal to the ascertained capability before transmission via the signaling channel by the one of the plurality switch nodes.

17. The method of claim 16 wherein the next sequential one of the plurality switch nodes is a destination switch node of the communication path with the destination terminal connected to the destination switch node, the method further comprises the steps of ascertaining a capability of the destination terminal to provide the requested communication bandwidth;

only accepting the ascertained communication bandwidth by the destination terminal;

forming a second message in response to receipt of the first message by the destination terminal;

inserting allocation information into the second message that is equal to the ascertained capability to provided requested communication bandwidth by the destination terminal; and transmitting the formed second message back on the signaling channel by the destination terminal.

18. The method of claim 17 further comprises the step of readjusting the communication bandwidth by each of the plurality of switch nodes in the communication path to be equal to that specified by the allocation information in response to receipt of the second message by each of the plurality of switch nodes.

19. The method of claim 18 further comprises the step of adjusting the bandwidth of the origination terminal to that designated by the allocation information in the second message by the origination terminal in response to the second message.

20. A method for adjusting the telecommunication bandwidth of an active telecommunication call being communicated through a plurality of switch nodes with a signaling channel for the telecommunication call being established through the plurality of switch nodes, the method comprising the steps of:

receiving a first message requesting a change in the telecommunication bandwidth of the telecommunication call via the signaling channel by a first switch node;

determining a requested change in telecommunication bandwidth by the first switch node from the first message;

ascertaining a capability of the switch node to provide the requested telecommunication bandwidth;

adjusting the telecommunication bandwidth through the switch node to provide the requested telecommunication bandwidth; and transmitting the first message via the signaling channel to a next sequential switch node in the telecommunication call.

21. The method of claim 20 wherein the step of adjusting comprises the step of only providing the ascertained capability of telecommunication bandwidth for the telecommunication call.

22. The method of claim 21 wherein the step of transmitting comprises the step of setting the requested change equal to the ascertained capability before transmission the first message via the signaling channel.

23. The method of claim 22 wherein another switch node is the destination switch node of the telecommunication call, the method further comprises the steps of forming a second message in response to receipt of the first message by the other switch node;

inserting allocation information into the second message that is equal to requested change in the first message received by the other switch node; and transmitting the formed second message back on the signaling channel by the other switch node.

24. The method of claim 23 further comprises the step of readjusting the telecommunication bandwidth by the switch node to be equal to that specified by the allocation information in response to receipt of the second message by the switch node.

25. A method for adjusting telecommunication bandwidth during a telecommunication call that is being communicated through a switch node with a signaling channel being assigned to the telecommunication call, and a plurality of software routines are executed by the switch node, the method comprising the steps of:

receiving a first message via the signaling channel by a first software routine;

identifying the first message as being a first half of the telecommunication call by matching identification information of the signaling channel with identification information in a first internal table containing information defining the first half of the telecommunication call by the first software routine;

determining the availability of telecommunication bandwidth requested by the first message by the first software routine;

requesting that a second software routine reserve the requested telecommunication bandwidth for the telecommunication call by entering parameters defining the requested telecommunication bandwidth into a second internal table that also stores parameters defining a present telecommunication bandwidth of the call whereby the second internal table is identified by identification information of the signaling channel and the first internal table;

transferring the first message to a second half of the telecommunication call by a third software routine;

identifying by the first software routine the first message as being the second half of the telecommunication call using information from a third internal table that also defines identification information for the signaling channel for the second half of the telecommunication call; and transmitting the first message from the switch node via the signaling channel on the second half of the telecommunication call by the first software routine.

26. The method of claim 25 wherein the step of determining comprises the steps of ascertaining bandwidth capability of the switch node;

the step of requesting comprises the step of only requesting that the second software routine enter parameters to provide the ascertained bandwidth capability into the second internal table; and the step of transferring comprises the step of modifying the requested telecommunication bandwidth in the first message to be equal to the ascertained telecommunication bandwidth.

27. The method of claim 26 further comprises the steps of receiving a second message;

identifying the second message by the first software routine as being part of the second half of the telecommunication call by the identification information of the signaling channel;

determining from allocation information in the second message the telecommunication bandwidth requested for the telecommunication call by the first software routine;

requesting that the second software routine adjust the parameters in the second internal table to provide the telecommunication bandwidth specified in the allocation information and that the second software routine establish the requested telecommunication bandwidth through the switch node.

28. The method of claim 27 further comprises the steps of transferring the second message to the first half of the telecommunication call by the third software routine;

identifying by the first software routine the second message as being the first half of the telecommunication call using information from the third internal table that also defines identification information for the signaling channel for the first half of the telecommunication call; and transmitting the second message from the switch node via the signaling channel on the first half of the telecommunication call by the first software routine.

29. An apparatus of switching communication bandwidth on a communication path through a switching system, and the switching system having a plurality of switch nodes, the apparatus comprising:

means in a terminating one of the plurality of switch nodes for transmitting a first message for switching the communication bandwidth on the communication path through the switching system;

means in a first one of the plurality of switch nodes for receiving the first message via a signaling channel that is part of the communication path;

means in the first one of the plurality of switch nodes for determining a requested change in telecommunication bandwidth from the first message;

means in the first one of the plurality of switch nodes for modifying the communication bandwidth through the switch node to provide the requested communication bandwidth; and means in the first one of the plurality of switch nodes for transmitting the first message via the signaling channel to a next sequential one of the plurality of switch nodes in the communication path.

30. The apparatus of claim 29 wherein the communication bandwidth is modified by type of bandwidth.

31. The apparatus of claim 29 wherein the communication bandwidth is increased.

32. The apparatus of claim 29 wherein the communication bandwidth is decreased.

33. The apparatus of claim 29 wherein the means for modifying comprises means for ascertaining a capability of the one of the plurality switch nodes to provide the requested communication bandwidth.

34. The apparatus of claim 33 wherein the means for modifying further comprises means for only providing the ascertained capability of communication bandwidth for the communication path.

35. The apparatus of claim 34 wherein the means for transmitting comprises means for setting the requested change of the first message equal to the ascertained capability before transmission via the signaling channel.

36. The apparatus of claim 35 wherein the next sequential one of the plurality switch nodes is a destination switch node of the communication path, the apparatus further comprises means in the destination switch node for ascertaining a capability of the next sequential one of the plurality of switch nodes to provide the requested communication bandwidth;

means in the destination switch node for only providing the ascertained communication bandwidth;

means in the destination switch node for forming a second message in response to receipt of the first message;

means in the destination switch node for inserting allocation information into the second message that is equal to the ascertained capability to provided requested communication bandwidth; and means in the destination switch node for transmitting the formed second message back on the signaling channel.

37. The apparatus of claim 36 further comprises means in each of the plurality of switch nodes for readjusting the communication bandwidth in the communication path to be equal to that specified by the allocation information in response to receipt of the second message.

38. An apparatus of switching communication bandwidth on a communication path through a switching system, from a origination terminal to a destination terminal and the switching system having a plurality of switch nodes, the apparatus comprising:

means in an origination terminal for transmitting a first message for switching the communication bandwidth on the communication path through the switching system;

means in the plurality of switch nodes and the destination terminal for changing the communication bandwidth as specified by the first message without reestablishing the communication path;

the means for changing comprises means a first one of the plurality of switch nodes for receiving the first message via a signaling channel that is part of the communication path;

means in the first one of the plurality of switch nodes for determining a requested change in telecommunication bandwidth from the first message;

means in the first one of the plurality of switch nodes for modifying the communication bandwidth through the switch node to provide the requested communication bandwidth; and means in the first one of the plurality of switch nodes for transmitting the first message via the signaling channel to a next sequential one of the plurality of switch nodes in the communication path.

39. The apparatus of claim 38 wherein the communication bandwidth is modified by type of bandwidth.

40. The apparatus of claim 38 wherein the communication bandwidth is increased.

41. The apparatus of claim 38 wherein the communication bandwidth is decreased.

42. The apparatus of claim 38 wherein the means in the one of the plurality of switch nodes for modifying comprises means for ascertaining a capability of the one of the plurality switch nodes to provide the requested communication bandwidth.

43. The apparatus of claim 42 wherein the means in the one of the plurality of switch nodes for modifying further comprises means for only providing the ascertained capability of communication bandwidth for the communication path.

44. The apparatus of claim 43 wherein the means in the one of the plurality switch nodes for transmitting comprises means for setting the requested change of the first message equal to the ascertained capability before transmission via the signaling channel.

45. The apparatus of claim 44 wherein the next sequential one of the plurality switch nodes is a destination switch node of the communication path with the destination terminal connected to the destination switch node, the apparatus further comprises means for ascertaining a capability of the destination terminal to provide the requested communication bandwidth;

means in the destination terminal for only accepting the ascertained communication bandwidth;

means in the destination terminal for forming a second message in response to receipt of the first message;

means in the destination terminal for inserting allocation information into the second message that is equal to the ascertained capability to provided requested communication bandwidth; and means in the destination terminal for transmitting the formed second message back on the signaling channel.

46. The apparatus of claim 45 further comprises means in each of the plurality of switch nodes for readjusting the communication bandwidth in the communication path to be equal to that specified by the allocation information in response to receipt of the second message by each of the plurality of switch nodes.

47. The apparatus of claim 46 further comprises means in the origination terminal for adjusting the bandwidth of the origination terminal to that designated by the allocation information in the second message in response to the second message.

48. An apparatus for adjusting the telecommunication bandwidth of an active telecommunication call being communicated through a plurality of switch nodes with a signaling channel for the telecommunication call being established through the plurality of switch nodes, the apparatus comprising:

means in a first switch node for receiving a first message requesting a change in the telecommunication bandwidth of the telecommunication call via the signaling channel;

means in the first switch node for determining a requested change in telecommunication bandwidth from the first message;

means for ascertaining a capability of the switch node to provide the requested telecommunication bandwidth;

means in the first switch node for adjusting the telecommunication bandwidth through the switch node to provide the requested telecommunication bandwidth; and means in the first switch node for transmitting the first message via the signaling channel to a next sequential switch node in the telecommunication call.

49. The apparatus of claim 48 wherein the means for adjusting comprises means for only providing the ascertained capability of telecommunication bandwidth for the telecommunication call.

50. The apparatus of claim 49 wherein the means for transmitting comprises means for setting the requested change equal to the ascertained capability before transmission the first message via the signaling channel.

51. The apparatus of claim 50 wherein another switch node is the destination switch node of the telecommunication call, the apparatus further comprises means in the other switch node for forming a second message in response to receipt of the first message;

means in the other switch node for inserting allocation information into the second message that is equal to requested change in the first message received; and means in the other switch node for transmitting the formed second message back on the signaling channel.

52. The apparatus of claim 51 further comprises means in the switch node for readjusting the telecommunication bandwidth to be equal to that specified by the allocation information in response to receipt of the second message by the switch node.

53. An apparatus for adjusting telecommunication bandwidth during a telecommunication call that is being communicated through a switch node with a signaling channel being assigned to the telecommunication call, and a plurality of software routines are executed by the switch node, the apparatus comprising:

means in a first software routine for receiving a first message via the signaling channel;

means in the first software routine for identifying the first message as being a first half of the telecommunication call by matching identification information of the signaling channel with identification information in a first internal table containing information defining the first half of the telecommunication call;

means in the first software routine for determining the availability of telecommunication bandwidth requested by the first message;

means in the first software routine for requesting that a second software routine reserve the requested telecommunication bandwidth for the telecommunication call by entering parameters defining the requested telecommunication bandwidth into a second internal table that also stores parameters defining a present telecommunication bandwidth of the call whereby the second internal table is identified by identification information of the signaling channel and the first internal table;

means in a third software routine for transferring the first message to a second half of the telecommunication call;

means in the first software routine for identifying the first message as being the second half of the telecommunication call using information from a third internal table that also defines identification information for the signaling channel for the second half of the telecommunication call; and means in the first software routine for transmitting the first message from the switch node via the signaling channel on the second half of the telecommunication call.

54. The apparatus of claim 53 wherein the means for determining comprises means for ascertaining bandwidth capability of the switch node;

the means for requesting comprises means for only requesting that the second software routine enter parameters to provide the ascertained bandwidth capability into the second internal table; and the means for transferring comprises means for modifying the requested telecommunication bandwidth in the first message to be equal to the ascertained telecommunication bandwidth.

55. The apparatus of claim 54 further comprises means for receiving a second message;

means in the first software routine for identifying the second message as being part of the second half of the telecommunication call by the identification information of the signaling channel;

means in the first software routine for determining from allocation information in the second message the telecommunication bandwidth requested for the telecommunication call; and means in the first software routine for requesting that the second software routine adjust the parameters in the second internal table to provide the telecommunication bandwidth specified in the allocation information and that the second software routine establish the requested telecommunication bandwidth through the switch node.

56. The apparatus of claim 55 further comprises means in the first software routine for transferring the second message to the first half of the telecommunication call;

means in the first software routine for identifying the second message as being the first half of the telecommunication call using information from the third internal table that also defines identification information for the signaling channel for the first half of the telecommunication call; and means in the first software routine for transmitting the second message from the switch node via the signaling channel on the first half of the telecommunication call.

* * * * *